May 29, 1934.    A. R. WICKHAM    1,961,025
MANUFACTURE OF SHEETS OR FILMS OF COMPOSITIONS
CONTAINING CELLULOSE ESTERS OR ETHERS
Filed Nov. 18, 1931
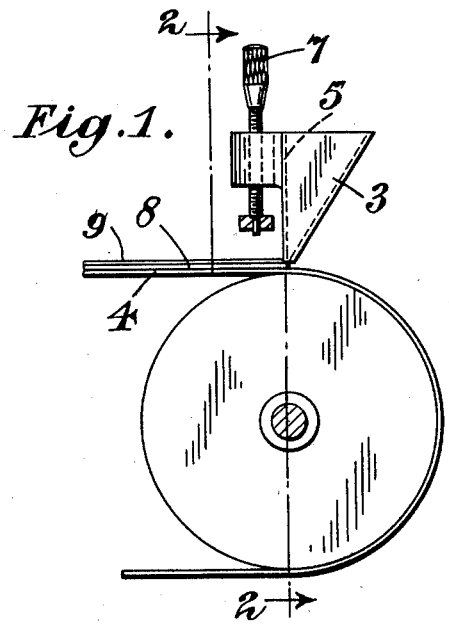
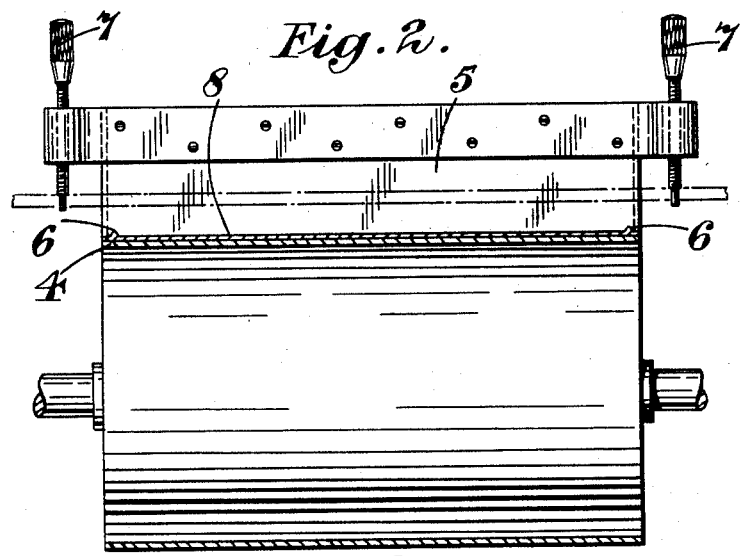
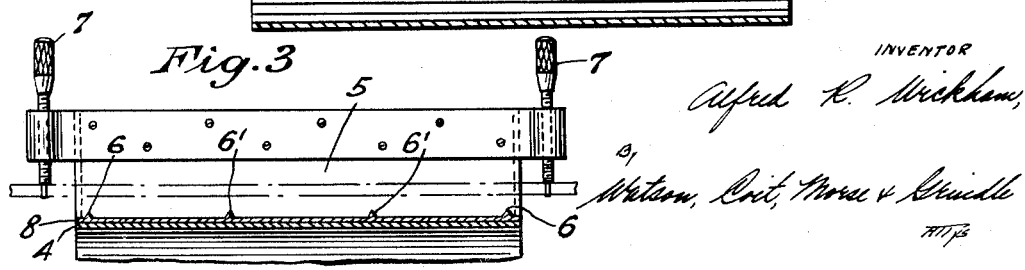

Patented May 29, 1934

1,961,025

UNITED STATES PATENT OFFICE 1,961,025

MANUFACTURE OF SHEETS OR FILMS OF COMPOSITIONS CONTAINING CELLULOSE ESTERS OR ETHERS

Alfred Robert Wickham, Sawston, England, assignor to Spicers Limited, London, England, a British company Application November 18, 1931, Serial No. 575,937
In Great Britain December 22, 1930

2 Claims. (Cl. 18—57)

This invention comprises improvements in or relating to the manufacture of sheets or films of compositions containing cellulose esters or ethers, for example cellulose acetate.

Such films are generally manufactured by the so-called "casting" process, according to which a solution in a volatile solvent of the composition which is to constitute the body of the film is spread on to a support, e. g. a travelling band or rotating drum, the solvent being allowed to evaporate, and the film thus left behind being stripped off from the support.

It is found, however, that difficulties arise in practice when a thin film, e. g. of .001 inch in thickness, is cast by this process, owing to the fact that tears are liable to form at the edges of the film as it is stripped off from the band.

The present invention provides a method for the manufacture of sheets or films of compositions containing cellulose esters or ethers, which consists in casting the film with thickened marginal portions, i. e. with marginal portions which are thicker than the body portion of the film.

According to a feature of the invention the thickened marginal portions of the film may be constituted by one or more longitudinal ridges at or near its edges.

It is found that the provision of thickened longitudinal ridges in close proximity to the edges of the film overcomes the tendency of the film to tear when it is stripped from the surface on which it is cast. Any tears which might chance to occur are arrested by the thickened ridge, and prevented from spreading to the body of the film.

The provision of these ridges at the edges of the film has a further important advantage in that, when the film is reeled after stripping, adjacent convolutions of the film are spaced apart from one another to a slight extent. This facilitates the evaporation of residual traces of solvent vapour from the film, which is important as if the residual solvent remains in the film, the latter tends to cockle and also has an unpleasant odor.

In the subsequent operation of trimming the edges of the film the longitudinal ridges, together with the thin strips of film outside them (which may be slightly torn are removed, thus leaving a film of uniform thickness, and with perfectly clean-cut edges.

It is frequently necessary to subdivide the film, by cutting it longitudinally, into a number of strips of film of less width. This is especially the case when the film is to be used for cinematograph purposes.

According to a further feature of the invention, for the purpose of avoiding tearing at the edges of the strips into which the film is subdivided, the latter may be cast with additional ridges of increased thickness spaced apart at distances equal to the width of said strips. These ridges, besides serving to prevent tearing of the edges of the strips, act as guiding marks to facilitate the cutting operation.

The invention also provides an apparatus for the manufacture of sheets or films of compositions containing cellulose esters or ethers by the above described method. The solution of the composition in question is normally extruded on to a travelling surface, and the thickness of the layer of composition applied to the surface is regulated by means of a spreader, which in the normal type of film-casting machine is constituted by the front wall of the casting box (i. e. the wall adjacent to that portion of the travelling support which has already been coated) but which may if desired be separated therefrom.

The invention also includes a sheet or film of a composition containing a cellulose ether or ester having at or near its edges one or more longitudinal ridges of increased thickness.

A practical embodiment of the invention will now be described by way of example with reference to the accompanying drawing, in which:—

Figure 1 is a sectional view of a film casting machine embodying the present invention, Figure 2 is a section along the line 2—2 in Figure 1, and Figure 3 is a fragmentary sectional view corresponding to Figure 2 and illustrating a modified form of the invention.

Like reference numerals indicate like parts throughout the drawing.

The travelling support to receive the "dope" from the casting box 3 comprises a copper band 4 coated with a layer of gelatine. The front wall 5 of the casting box is provided near the ends of its lower horizontal edge with two small nicks 6. The distance of the front wall 5, which acts as a spreader from the band is adjustable by means of micrometers 7 so as to vary the thickness of the coating of "dope" which is applied to the band. By means of this apparatus it is possible to cast a film 8 of 1/1000 inch in thickness, and to strip it from the gelatine-coated band without tearing, owing to the longitudinal ridges 9 of increased thickness which are found near its edges by the action of the nicks in the spreader. When it is desired to cast the film with additional longitudinal ridges at those points in its width where it is subsequently to be subdivided, further nicks may be provided at the appropriate points on the spreader as shown at 6' in Figure 3 of the drawing.

I claim:—

1. A method of manufacturing a film of a composition containing an organic derivative of cellulose to facilitate the removal of the film from a surface on which the film is freshly cast, which comprises forming thickened marginal portions on the film during casting on such a surface, stripping the film from the surface, and finally trimming the film to remove the thickened margins.

2. A method of manufacturing a film of a composition containing an organic derivative of cellulose to facilitate the removal of the film from a surface on which the film is freshly cast, which comprises forming a series of equally spaced parallel ridges of increased thickness on the film during casting on such a surface, stripping the film from the surface, subdividing the film along each of said ridges into a number of strips of equal width, and trimming the strips to remove the ridges.

ALFRED ROBERT WICKHAM.